(12) United States Patent
Sabato et al.

(10) Patent No.: US 7,587,376 B2
(45) Date of Patent: Sep. 8, 2009

(54) REFORMULATION OF CONSTRAINT SATISFACTION PROBLEMS FOR STOCHASTIC SEARCH

(75) Inventors: Sivan Sabato, Haifa (IL); Yehuda Naveh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 11/137,949

(22) Filed: May 26, 2005

(65) Prior Publication Data

US 2007/0005534 A1  Jan. 4, 2007

(51) Int. Cl.
*G06E 1/00* (2006.01)
*G06E 3/00* (2006.01)
*G06G 7/00* (2006.01)

(52) U.S. Cl. ...................................................... 706/19
(58) Field of Classification Search .................. 705/4, 705/27; 715/500; 706/46, 45, 51, 19, 13, 706/12, 47; 700/103
See application file for complete search history.

(56) References Cited

U.S. PATENT DOCUMENTS

| | | | |
|---|---|---|---|
| 5,636,328 A | | 6/1997 | Kautz et al. |
| 6,292,916 B1 * | | 9/2001 | Abramovici et al. ......... 714/736 |
| 2002/0169587 A1 * | | 11/2002 | Emek et al. ..................... 703/2 |
| 2003/0083762 A1 * | | 5/2003 | Farrah et al. ................... 700/97 |
| 2004/0267679 A1 * | | 12/2004 | Fromherz et al. ............. 706/19 |
| 2005/0021486 A1 * | | 1/2005 | Naveh .......................... 706/46 |
| 2006/0181647 A1 * | | 8/2006 | Fazzini ....................... 348/570 |

OTHER PUBLICATIONS

'Foundations of Constraint Satisfaction': Tsang, 1996, Academic Press Limited, p. 34 and p. 253-270.*
'Foundations of Constraint Satisfaction': Tsang, 1996, pp. 34, 253-270, 317.*
'Foundations of Constraint Satisfaction': Tsang, 1995, Academic press limited, p. 34, 110-112, 253-270.*
'Foundations of Costraint Satisfaction': Tsang, 1996, Academic press, pp. 6-7, 10, 34, 171-173, 255-256, 274-276.*
'Lifted search engine for satisfiability': Parks, 1999, University of Oregon.*
'A mixed closure CSP methdo to solve scheduling problems': Galipienso, 2001, Springer Verlag, ISBN 3 540 42219 6.*
Naveh, Yehuda, "Stochastic solver for constraint satisfaction problems with learning of high-level characteristics of the problem topography", 1st International Workshop on Local Search Techniques in Constraint Satisfaction, Toronto, Sep. 2004.

(Continued)

*Primary Examiner*—David R Vincent
*Assistant Examiner*—Peter Coughlan (57) ABSTRACT

A computer-implemented method for solving a constraint satisfaction problem (CSP), which is defined by variables and constraints applicable to the variables, and which has states corresponding to respective sets of values of the variables. The method includes assigning cost functions to the constraints so that the states have respective costs determined by application of the cost functions to the respective sets of values of the variables, the respective costs defining a problem topography of the CSP having global extrema corresponding to solutions of the CSP. The constraints of the CSP are reformulated so as to perform at least one of increasing a density of the solutions in the problem topography and smoothing a gradient of the problem topography. One or more of the solutions of the CSP are found by applying a stochastic CSP solver to the reformulated constraints.

11 Claims, 3 Drawing Sheets

OTHER PUBLICATIONS

Bin, E. et al., "Using a constraint satisfaction formulation and solution techniques for random test program generation", IBM Systems Journal 41:3 (2002), pp. 386-402.

Selman, Bart et al., "A New Method for Solving Hard Satisfiability Problems", Proceedings of the Tenth National Conference on Artificial Intelligence (AAAI-92, San Jose, California, 1992), pp. 440-446.

* cited by examiner

REFORMULATION OF CONSTRAINT SATISFACTION PROBLEMS FOR STOCHASTIC SEARCH

FIELD OF THE INVENTION

The present invention relates generally to solving constraint satisfaction problems, and specifically to methods and systems for solving such problems using stochastic techniques.

BACKGROUND OF THE INVENTION

Many of the tasks that are addressed by decision-making systems and artificial intelligence can be framed as constraint satisfaction problems (CSPs). In this framework, the task is specified in terms of a set of variables, each of which can assume values in a given domain, and a set of predicates, or constraints, that the variables are expected to satisfy. The set of variables and constraints is sometimes referred to as a constraint network. Each constraint may be expressed as a relation, defined over some subset of the variables, denoting valid combinations of their values. A solution to the problem is an assignment of a value to each variable from its domain that satisfies all the constraints.

Constraint satisfaction methods have been found useful in a variety of applications, including:
  Artificial intelligence
  Robotic control
  Temporal reasoning
  Natural language parsing
  Spatial reasoning
  Test generation for software and hardware systems
  Machine vision
  Medical diagnosis
  Resource allocation
  Crew scheduling
  Time tabling
  Frequency allocation
  Graph coloring.

For example, Bin et al. describe a constraint satisfaction method for use in automated testing of hardware circuits, in a paper entitled "Using a Constraint Satisfaction Formulation and Solution Techniques for Random Test Program Generation," IBM Systems Journal 41:3 (2002), pages 386-402, which is incorporated herein by reference. The authors use an analytical constraint satisfaction algorithm to generate addresses and memory access instructions that provide effective verification of the design of a computer processor. This algorithm, which is based on maintaining arc consistency in the constraint network, is described further by Emek et al. in U.S. patent application Ser. No. 09/788,152, published as U.S. Patent Application Publication 2002/0169587 A1, which is assigned to the assignee of the present patent application, and whose disclosure is incorporated herein by reference.

Stochastic techniques for CSP solving are also known in the art. For example, U.S. Pat. No. 5,636,328, whose disclosure is incorporated herein by reference, describes methods and apparatus for finding values that satisfy a set of constraints, applied particularly to control of a robotic arm. The technique described in this patent is used in local search procedures for finding such constraint-satisfying values, with the aim of overcoming the tendency of such local search procedures to "get stuck" at certain points in the search.

Another stochastic CSP solving technique, known as GSAT, is described by Selman et al., in "A New Method for Solving Hard Satisfiability Problems," Proceedings of the Tenth National Conference on Artificial Intelligence (AAAI-92, San Jose, Calif., 1992), pages 440-446, whose disclosure is incorporated herein by reference. GSAT performs a greedy local search for a satisfying assignment of a set of propositional clauses. It then changes the assignment of the variable that leads to the largest increase in the total number of satisfied clauses, repeating this procedure until a satisfying assignment is found (or until time runs out). GSAT mimics standard local search procedures used for finding approximate solutions to optimization problems, in that it explores only potential solutions that are "close" to the one currently being considered, although it may also include "sideways" moves.

Naveh describes a stochastic CSP solving technique based on variable-range hopping, in U.S. patent application Ser. No. 10/624,664, published as U.S. Patent Application Publication 2005/0021486 A1, which is assigned to the assignee of the present patent application, and whose disclosure is incorporated herein by reference. A metric, or cost, is associated with each of the constraints of the problem. The CSP solver starts by choosing a first state, corresponding to a first set of values of the CSP variables, and selecting a hop distance within the state space of the variables using to a random distance selection criterion. The solver then randomly selects a second state (corresponding to a second set of the values of the variables), which is separated from the first state by the hop distance. Constraint costs of the first and second states are compared. If the cost of the second state is lower than the cost of the first state, the first state is redefined to correspond to the second set of the values of the variables. These steps are repeated until a solution of the CSP is found.

SUMMARY OF THE INVENTION

Stochastic CSP solvers map the CSP into an optimization problem, in which the optimization metrics are defined by the constraints, and solutions to the problem are found at global minima of the problem topography. Local search procedures that are used in stochastic CSP solvers, such as those described in the Background section above, attempt to find these global minima while escaping local minima in the topography where the search may get stuck. The difficulty of this search is strongly influenced by the density of solutions in the search space and the smoothness of the gradients in the topography surrounding these solutions.

Embodiments of the present invention provide improved methods and apparatus for stochastic solving of CSPs based on automatic reformulation of the CSP to enhance the solution density and gradients of the problem topography. In these embodiments, a metric, referred to herein as a cost, is associated with each of the constraints of the problem. States of the CSP are defined by the values of the variables in the problem. The CSP solver calculates the topographic cost of any given state by combining the costs of all the constraints, which depend, in turn, on the values of the variables to which each constraint applies. The problem is solved when the solver finds a state whose topographic cost reaches a global extremum, such as a global minimum, which is typically chosen to be zero.

The enhancement of the solution density and gradients may be achieved by a combination of techniques. In disclosed embodiments, these techniques include eliminating redundant constraints and restating others, as well as eliminating superfluous bits and variables from the problem. Such techniques reduce the size of the search space (by removing parts of the space that do not contain solutions, thus increasing the solution density) and reduce spurious variations in the topographic cost profile (so that gradients slope smoothly toward the solutions). Consequently, the inventors have found that when a stochastic CSP solver is applied to the problem after reformulation, it converges to solutions faster and, in some cases, is able to find solutions to problems that were previously unsolvable.

There is therefore provided, in accordance with an embodiment of the present invention, a computer-implemented method for solving a constraint satisfaction problem (CSP), which is defined by variables and constraints applicable to the variables, and which has states corresponding to respective sets of values of the variables, the method including:

assigning cost functions to the constraints so that the states have respective costs determined by application of the cost functions to the respective sets of values of the variables, the respective costs defining a problem topography of the CSP having global extrema corresponding to solutions of the CSP;

reformulating the constraints of the CSP so as to perform at least one of increasing a density of the solutions in the problem topography and smoothing a gradient of the problem topography; and finding one or more of the solutions of the CSP by applying a stochastic CSP solver to the reformulated constraints.

In a disclosed embodiment, the method includes defining the constraints as a set of sub-constraints linked by logical operators, wherein the respective costs of the states are determined by recursively combining the cost functions of the sub-constraints. Such a set is hereinafter referred to as a composite constraint. A sub-constraint may be atomic constraint, which is composed of arithmetic expressions linked by comparison operators. Alternatively, the sub-constraint may itself be a composite constraint. Assigning the cost functions includes assigning respective atomic cost functions to the atomic constraints, and recursively determining the cost functions of the composite constraints from the cost functions of the sub-constraints they include.

In some embodiments, increasing the density of the solutions includes eliminating a region of the problem topography that does not contain any of the solutions to the CSP. Typically, the variables include bits, and eliminating the region includes identifying one or more of the bits that must have a specific value in order for the CSP to be satisfied, and setting the one or more of the bits to the specific value.

Additionally or alternatively, smoothing the gradient includes eliminating one or more local extrema from the problem topography.

In some embodiments, the constraints in the CSP include logical operators, which include at least one of a negation operator and implication operators, and reformulating the constraints includes eliminating from the constraints one or more of the negation and implication operators. Additionally or alternatively, reformulating the constraints includes identifying at least one of the variables that is aliased, such that the at least one of the variables can be expressed as a function of one or more others of the variables, and replacing the at least one of the variables in the constraints with an expression in terms of the one or more others of the variables.

In some embodiments, the method includes defining the constraints as a composite constraint, wherein reformulating the constraints includes determining that at least one of the sub-constraints is tautological, and eliminating the at least one of the sub-constraints from the CSP. Additionally or alternatively, reformulating the constraints includes determining that two or more of the sub-constraints that are linked as operands of one of the logical operators are equivalent, and eliminating at least one of the two or more of the sub-constraints from the CSP.

In a disclosed embodiment, the variables are characteristic of inputs to a system under test, and finding the one or more of the solutions includes determining the values of the inputs to be applied in testing the system.

In another embodiment, the variables are characteristic of control parameters of a mechanical system, and finding the one or more of the solutions includes controlling the system responsively to the values of the variables in the one or more of the solutions.

In still another embodiment, the variables are characteristic of features of an image containing visual information, and finding the one or more of the solutions includes identifying an object in the image based on the features, responsively to the values of the variables in the one or more of the solutions.

In yet another embodiment, the variables are characteristic of a natural language input, and finding the one or more of the solutions includes parsing the natural language, responsively to the values of the values of the variables in the one or more of the solutions, so as to interpret the language.

In a further embodiment, the variables are characteristic of a condition, and finding the one or more of the solutions includes determining a diagnosis of the condition responsively to the values of the variables in the one or more of the solutions.

In an alternative embodiment, the variables are characteristic of resources whose use is to be scheduled, and finding the one or more of the solutions includes scheduling the use of the resources responsively to the values of the variables in the one or more of the solutions.

There is also provided, in accordance with an embodiment of the present invention, apparatus for solving a constraint satisfaction problem (CSP), including:

an input, which is coupled to receive a definition of the CSP, including variables and constraints applicable to the variables, the CSP having states corresponding to respective sets of values of the variables; and a CSP processor, which is arranged to assign cost functions to the constraints so that the states have respective costs determined by application of the cost functions to the respective sets of values of the variables, the respective costs defining a problem topography of the CSP having global extrema corresponding to solutions of the CSP, and which is further arranged to reformulate the constraints of the CSP so as to perform at least one of increasing a density of the solutions in the problem topography and smoothing a gradient of the problem topography, and to find one or more of the solutions of the CSP by applying a stochastic CSP solver to the reformulated constraints.

There is additionally provided, in accordance with an embodiment of the present invention, a computer software product for solving a constraint satisfaction problem (CSP), the product including a computer-readable medium in which program instructions are stored, which instructions, when read by a computer, cause the computer to receive a definition of the CSP, including variables and constraints applicable to the variables, the CSP having states corresponding to respective sets of values of the variables, and to assign cost functions to the constraints so that the states have respective costs determined by application of the cost functions to the respective sets of values of the variables, the respective costs defining a problem topography of the CSP having global extrema corresponding to solutions of the CSP, and which is further arranged to reformulate the constraints of the CSP so as to perform at least one of increasing a density of the solutions in the problem topography and smoothing a gradient of the problem topography, and to find one or more of the solutions of the CSP by applying a stochastic CSP solver to the reformulated constraints.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Figure 1:
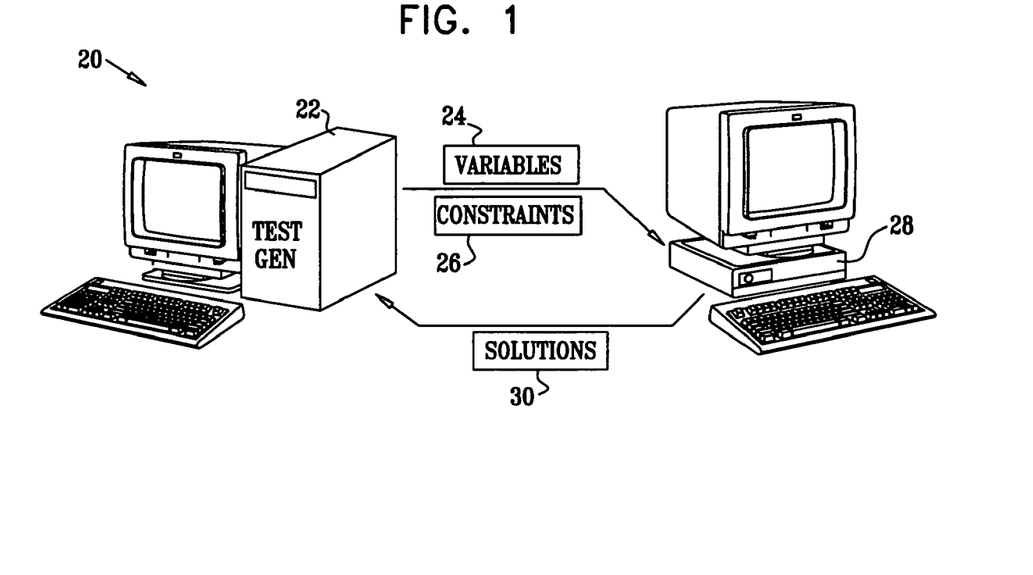
FIG. 1 is a schematic, pictorial illustration of a system for automatic test generation based on CSP solving, in accordance with an embodiment of the present invention.

FIG. 1 is a schematic pictorial illustration of a system 20 for automatic test generation, in accordance with a preferred embodiment of the present invention. A test generator 22, as is known in the art, provides a set of variables 24 and constraints 26 that are characteristic of a type of test to be carried out. These variables and constraints, which define a constraint satisfaction problem (CSP) to be solved, may be determined automatically by test generator 22 or manually, by a user of the system. A CSP processor 28 receives the variables and constraints at its input interface, and solves the CSP to define and output a set of solutions 30. The solutions in this case may determine values of variables 24 to be used by test generator 22 in testing a given design. Typically, constraints 26 are defined so that tests carried out using solutions 30 examine "interesting" aspects of the hardware design, increasing the likelihood that the test generator will discover design bugs.

Processor 28 reformulates and solves the CSP defined by variables 24 and constraints 26 using methods described hereinbelow. Generally speaking, the variables are represented by processor 28 as sequences of bits. For example, a variable representing data in a computer register may be a sequence of eight bits, while an integer or floating-point variable may be represented as a sequence of 32 bits. A state of the CSP is defined by a set of values of all the variables. The state is changed by flipping the values of certain selected bits (i.e., changing 0 to 1 and vice versa.)

Processor 28 treats constraints 26 as objects, each of which operates on a respective subset of the variables. Each constraint calculates its own respective cost for any given state of the CSP, depending on the bit values of the variables in its respective subset in that state. The cost of a constraint is zero for a given state if and only if the constraint is satisfied in that state. Otherwise, the cost is positive. (Alternatively, other metrics may be defined with negative costs and/or different values or ranges of values corresponding to solutions of the CSP.) A CSP solver process (referred to hereinafter simply as the "CSP solver"), running on processor 28, combines the prices of all the constraints, as described hereinbelow, to determine the topographic cost of the given state. The state is a solution of the CSP if its topographic cost is equal to (or in some schemes—within some bound of) a global extremum. In the embodiments described hereinbelow, the costs of the constraints are defined so that the solutions are global minima, with a total cost of zero.

Typically, processor 28 comprises a general-purpose or dedicated computer, programmed with suitable software for carrying out the cost computation and CSP solving functions described herein. The software may be supplied to the computer in electronic form, over a network or communication link, for example, or it may be provided on tangible media, such as CD-ROM or DVD.

In one embodiment of the present invention, variables 24 define possible inputs to a hardware device or software program under evaluation using test generator 22. These inputs are typically instructions and addresses that would be input to the device or program in normal operation. Processor 28 uses constraints 26 provided by test generator 22, and/or constraints that it receives from an operator or computes automatically itself, to determine variable values corresponding to combinations of the instructions and addresses to be used as test inputs by test generator 22. These inputs may then be applied to the actual device or program, or they may be used as test cases by a simulator for pre-production verification of the design of the device or program. Further details of the use of CSP solving in the context of this sort of test generation are described in the above-mentioned publications US 2002/0169587 A1 and US 2005/0021486 A1.

Alternatively, processor 28 may be configured to solve a wide range of other types of constraint satisfaction problems, and is not limited to the test generation application described above. The processor may be used, either in the configuration of a stand-alone computer or integrated with other input and output devices, to carry out substantially any function that can be associated with a constraint network. Examples of such functions are listed in the Background of the Invention, and include controlling a robot based on sensor inputs; analyzing visual or spatial information to identify and characterize objects in an image; parsing natural language input to interpret its meaning; suggesting medical diagnoses based on symptoms and test results; and determining resource allocations and scheduling. Other applications of processor 28 will be apparent to those skilled in the art.

Figure 2A:
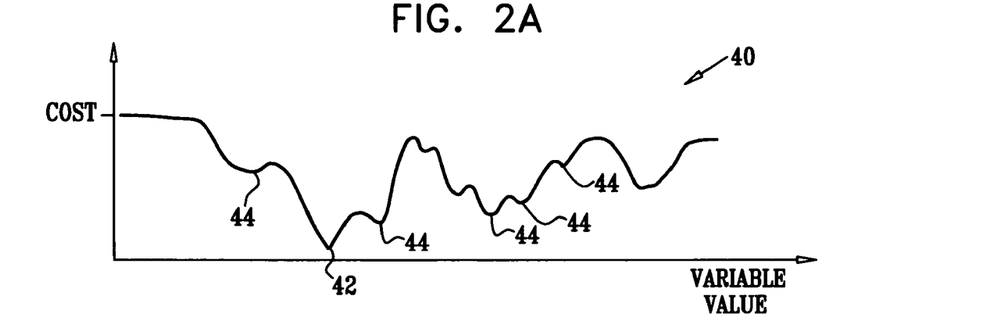
FIG. 2A is a plot that schematically illustrates a cost function used in solving a CSP, in accordance with an embodiment of the present invention.

FIG. 2A is a plot that schematically illustrates a cost function 40 and its use in solving a CSP, in accordance with an embodiment of the present invention. Function 40 represents a one-dimensional section of the state space of an arbitrary CSP, which normally comprises a multi-dimensional hyperspace, in which the number of dimensions is equal to the number of variables. Function 40 is thus a projection of the topography of the CSP along a certain path in the state space. In this example, the topography is characterized by multiple local minima 44. A global minimum 42 corresponds to a solution to the CSP.

To find the solutions to the CSP, the solver begins from some initial state within the state space, and then hops to a new state by changing the value of a certain variable or variables. When the new state has a lower topographic cost than the current state, the new state becomes the current state. In this manner, the solver searches through the state space until it finds global minimum 42. It commonly occurs that the search path becomes trapped in one of local minimum 44, particularly if the local minimum is deep. Stochastic CSP solving techniques known in the art provide methods for escaping from local minima in this sort of situation. For example, the above-mentioned US 2005/0021486 A1 describes a method based on variable-range hopping. Nevertheless, it can be appreciated that the search for a global minimum will be lengthier and more difficult the more sparsely distributed are the global minima in the search space and the more local minima are encountered along the way.

Figure 2B:
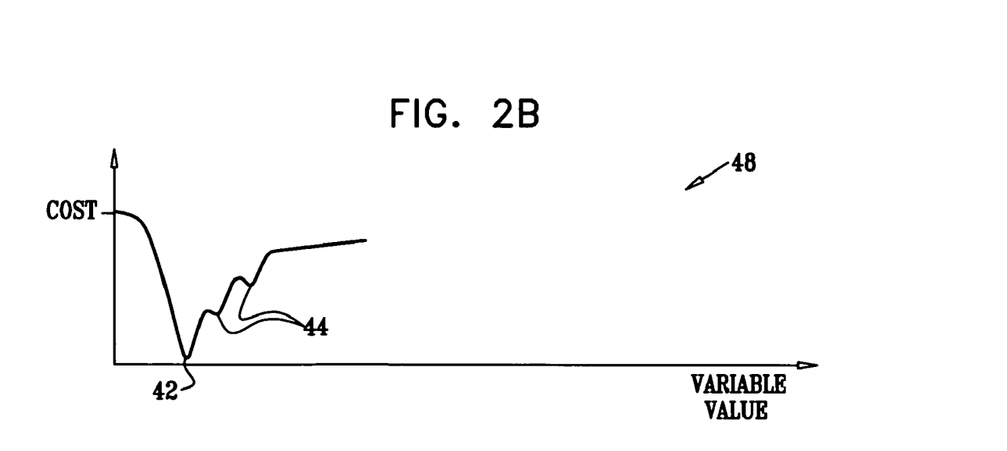
FIG. 2B is a plot that schematically illustrates a cost function used in solving the CSP of FIG. 2A, following reformulation of the CSP in accordance with an embodiment of the present invention.

FIG. 2B is a plot that schematically illustrates a cost function 48 of the CSP of FIG. 2A after reformulation of the CSP in accordance with an embodiment of the present invention. The reformulation has two major effects on the problem topography:

It reduces the size of the search space and thus increases the density of solutions. The size reduction is achieved by eliminating regions of the search space that are known not to contain global minima.

It smooths the gradient of the cost function, thus reducing the number and/or depth of the local minima. In other words, following reformulation, the cost associated with a state is more nearly proportional to the distance of the state from a solution, with fewer spurious variations in the cost.

Exemplary methods for CSP reformulation that achieve these effects are described hereinbelow. Alternative methods for enhancing the solution density and gradients of the CSP topography will be apparent to those skilled in the art after reading the present patent application. Such alternative methods are also considered to be within the scope of the present invention.

Figure 3A:
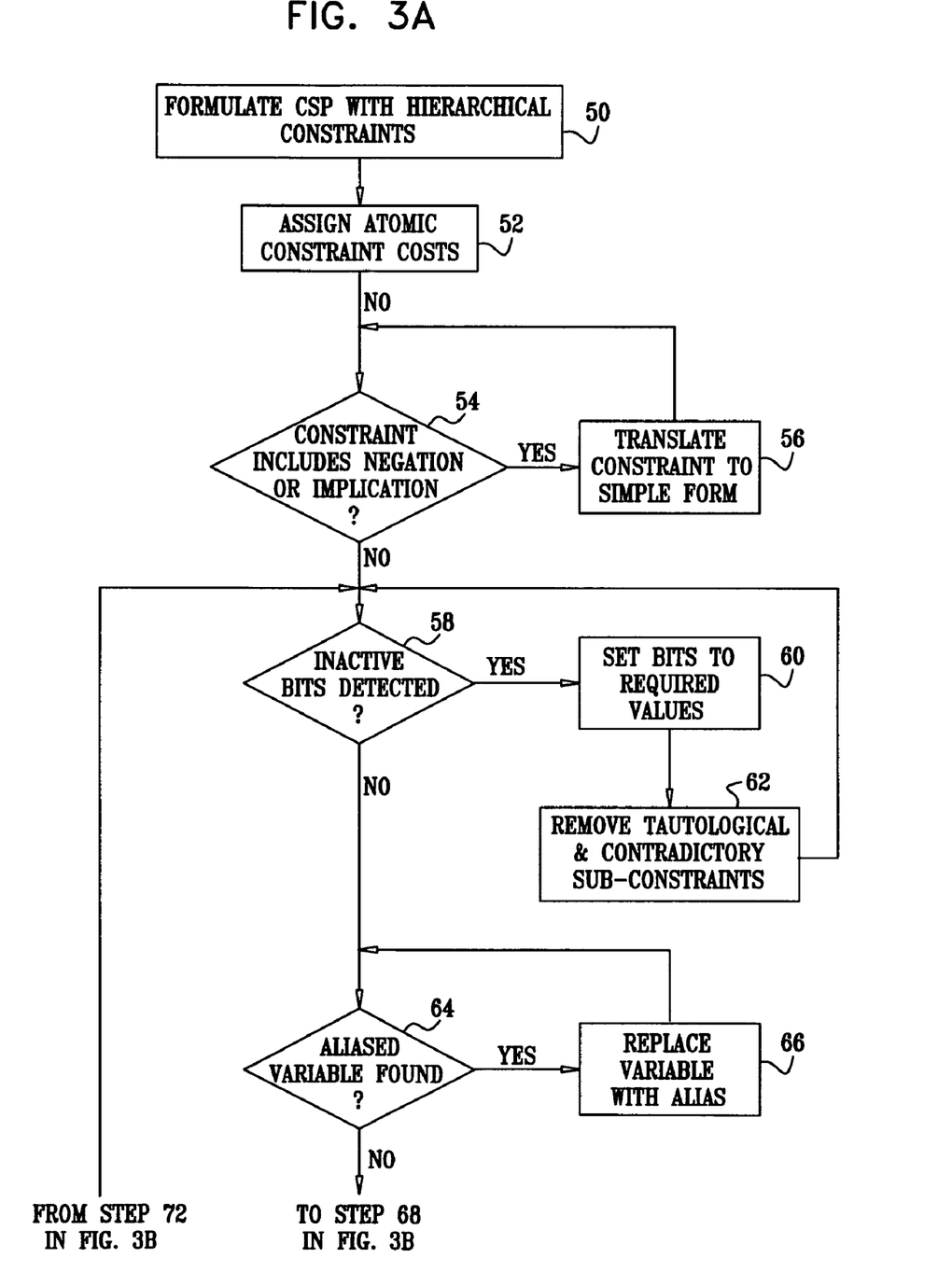
FIGS. 3A and 3B are a flow chart that schematically illustrates a method for reformulating and solving a CSP, in accordance with an embodiment of the present invention.
Figure 3B:
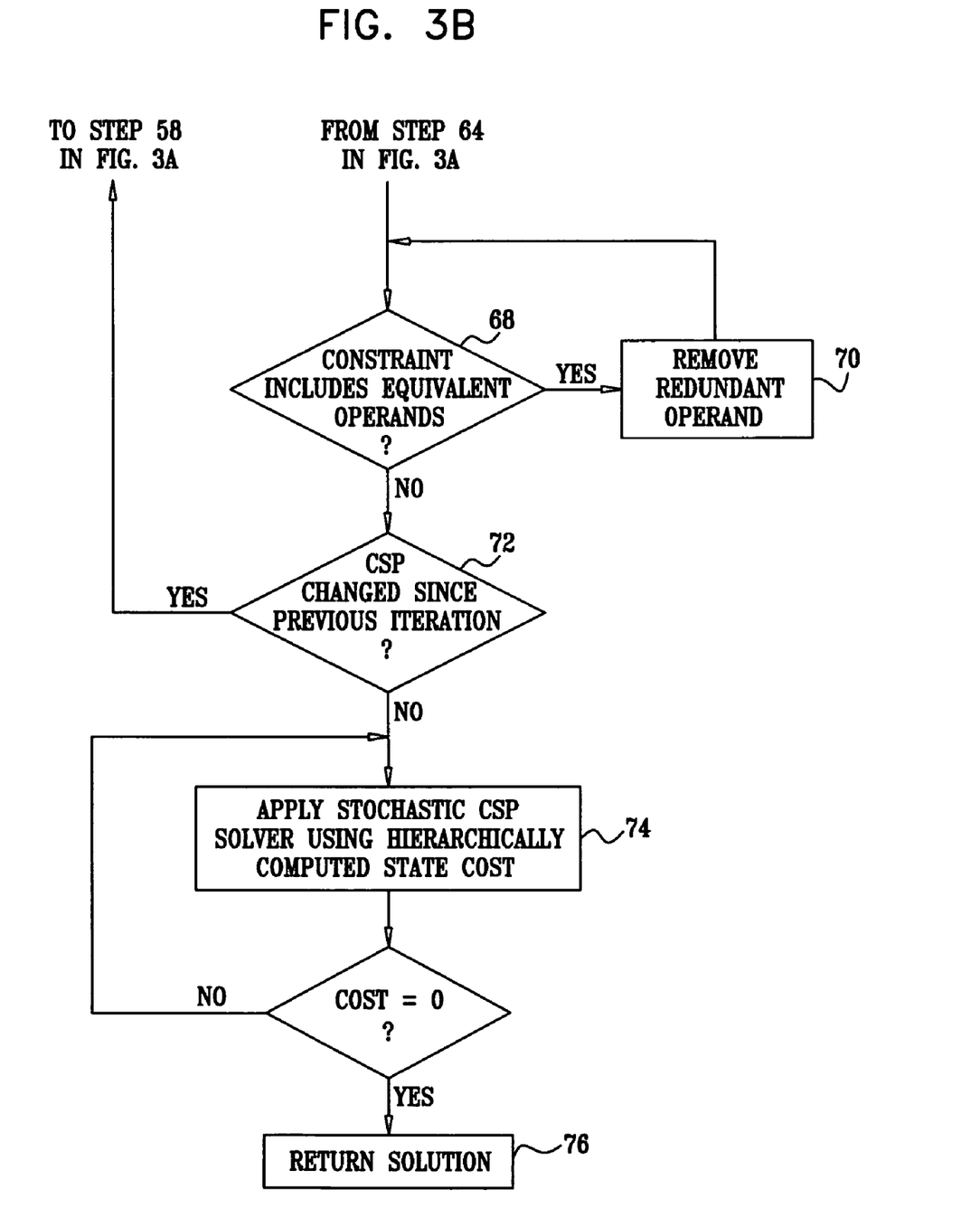

FIGS. 3A and 3B are a flow chart that schematically illustrates a method for CSP reformulation and solving, in accordance with an embodiment of the invention. The method begins with formulation of the CSP as a system of constraints, at a CSP formulation step 50. This step may be carried out by a human operator of processor 28, or alternatively or additionally, the constraints may be generated automatically, by test generator 22, for example.

For the purposes of the reformulation methods described hereinbelow, it is most convenient that the constraints be expressed as a set of sub-constraints (hereinafter referred as a composite constraint). The sub-constraints may themselves be composite constraints. The lowest level of sub-constraints comprises atomic constraints, which are composed of arithmetic expressions (including one or both of numerical and bitwise arithmetic) combined by comparison operators. In other words, arithmetic operators are applied to specified variable values, and the results are compared to give a logical (true or false) value. Non-atomic constraints are composed of sub-constraints combined by logical operators. Examples of constraints that are expressed in this manner include the following:

$(X+Y*3 \leq Z \& 0 \times 4)$ and $(((Z-X)*(Y+Z)=X) \Leftrightarrow (4-X>2))$
$(X=13) \rightarrow not(Y=1)$
$((Y<Z-1)$ or $(Z=3))$ and not $((X \geq 8)$ or $(Y^\wedge Z=1))$ Formally, the language used to generate the above constraints (referred to herein as "L1") is defined by the grammar given in the following table:

TABLE I

L1 CONSTRAINT LANGUAGE

C ⇒ (C) OP (C)
C ⇒ not(C)
C ⇒ E COMP E
E ⇒ (E) ARITH (E)
E ⇒ NUM
E ⇒ VAR
NUM ⇒ [0-9]+
VAR ⇒ [A-Z][A-Za–z0-9]+
OP ⇒ and | or | → | ↔
COMP ⇒ = | ≧ | ≦ | < | >
ARITH ⇒ + | – | * | / | "|" | & | ^

The start symbol, C, represents a constraint, while E represents an expression. The arithmetic operators "|" and "&" represent bitwise "or" and "and," respectively. Using the L1 language, an entire CSP may be expressed as a single constraint, made up by treating all the individual constraints as sub-constraints and conjoining them with the "and" operator. The functions of the negation operator "not" and the implication operators "→" and "↔" are illustrated by example in the description that follows.

The cost function of a CSP expressed by L1 is calculated recursively using the nature of the composite constraints. For this purpose, a cost function is assigned to each atomic constraint in the CSP, at a cost assignment step 52. As noted above, the cost functions of the atomic constraints are generally defined so that the cost of a constraint is zero if and only if the constraint is satisfied, and the further the state of the variables from a solution to the CSP, the higher the cost. For example, the cost function for an atomic equality constraint between two 32-bit integers i and j might be equal to the number of bits in i that differ from the corresponding bits in j. There are no a priori requirements, however, imposed on the relative magnitudes of different constraints. In other words, different constraints may have different ranges of costs and need not be normalized.

The cost function of each composite constraint is calculated based on the costs of the sub-constraints that the composite constraint is composed of and based on the operators used in combining the sub-constraints. Each sub-constraint may be an atomic constraint or a composite constraint. Thus, once cost functions have been assigned to the atomic constraints, there is no need to design a new cost function for each new constraint, and processor 28 can compute the cost of any constraint automatically. Various methods may be used to assign atomic constraint costs and to combine the atomic constraint costs to give the cost of an entire constraint under a given assignment of the variables. Table II below shows an exemplary method is pseudocode form:

TABLE II

COST COMPUTATION OF A COMPOSITE CONSTRAINT

```
CalculateCost(Constraint) : returns Cost
{
  if Constraint is atomic
    Cost ← CalculateAtomicConstraintCost(Constraint)
  else
    OperandCostList ← ( )
    for each operand of Constraint
      operandCost ← CalculateCost(operand)
      append operandCost to OperandCostList
    end for each loop
      Cost ← CalculateCostByOperands(Constraint, OperandCostList)
  end if
}
```

CalculateAtomicConstraintCost(Constraint): Returns Cost

The function CalculateAtomicConstraintCost is determined by the type of the atomic constraint. For example, an equality constraint returns the bit-distance between the compared expressions as its cost, as explained above.

CalculateCostByOperands(Constraint, OperandCostList): Returns Cost

The function CalculateCostByOperands is determined by the type of the non-atomic constraint. For "and" constraints, the cost may be the sum of costs of all operands. For "or" constraints, the cost may be the minimal cost among the costs of all the operands.

After the CSP and its cost functions have been defined at steps 50 and 52, processor 28 reformulates the CSP in order to render the problem easier to solve by stochastic algorithms. The methods that may be used to reformulate the constraints include:
1. Elimination of negation and implication from the problem.
2. Removing irrelevant bits from the search space.
3. Identifying aliased variables and removing them from the problem.
4. Identifying and removing redundant sub-constraints.

Exemplary implementations of these methods are described in the context of the method steps below. The order and specific implementation of these steps have been chosen for reasons of convenience and clarity. Alternative orders and methods of implementation may also be used. Furthermore, a CSP may be advantageously reformulated using any one of the methods individually, independently of the other methods, or using a combination of two or three of these methods. Furthermore, the methods described herein may be combined with other reformulation steps, as will be apparent to those skilled in the art. All such implementations, combinations, sub-combinations and alternative orders of execution are considered to be within the scope of the present invention.

The computation of the cost function of composite constraints, based on the structure of the constraints, renders the cost function vulnerable to the way the constraint is represented. In particular, for a constraint that is expressed using negation it is difficult to define a cost function that correlates well with the distance of the constraint from being satisfied. To understand why this is so, consider a situation in which a sub-constraint C1 is negated to form a constraint C2, i.e., C2=not(C1). The principles of cost assignment described above impose the following requirements on this structure:
1. $Cost_{C1}(A)=0$ iff C1 is satisfied by A.
2. $Cost_{C2}(A)=0$ iff C1 is not satisfied by A.
3. $Cost_{C2}(A)$ is a function of $Cost_{C1}(A)$.

wherein $Cost_C$ is the cost function for constraint C, and A is a complete assignment. Given these three requirements, the only possible cost function for $Cost_{C2}$ is:
If C1 is satisfied in A, $Cost_{C2}(A)=0$
Otherwise, $Cost_{C2}=K$ for some positive constant K. This binary cost function clearly provides only a weak distance-cost correlation. A similar problem exists for implications.

Therefore, processor 28 analyzes the CSP in order to identify constraints that contain negation or implication, at a negation/implication detection step 54. Upon detecting a "bad" constraint of this sort at step 54, processor 28 eliminates the negation and/or implication from the constraint, at a constraint translation step 56. The processor translates the constraint into an equivalent, simple form without negation and implication operations. For this purpose, the processor applies the following translations recursively, until no further translation is possible:
C1⇔C2⇒(C1→C2) and (C2→C1)
C1→C2⇒not(C1) or C2
not (C1 and C2 ... and Cn)⇒not(C1) or not(C2) ... or not(Cn)
not (C1 or C2 ... or Cn)⇒not(C1) and not(C2) ... and not(Cn)

When C1, C2, etc., reach the level of atomic constraints, the elimination of negation depends on the specific constraint. For example:
not (a=b)⇒a≠b
not (a≠b)⇒a=b
not (a>b)⇒a≦b
not (a≦b)⇒a>b As a result of this translation, more meaningful cost functions can be assigned to all the atomic constraints, thereby smoothing gradients in the problem topography.

Next, processor 28 examines the CSP in order to identify inactive bits, at an inactive bit detection step 58. "Inactive bits" are defined herein as bits in CSP variables that must have a specific value for the CSP to be satisfied. Upon identifying such bits and their required values, processor 28 sets the bits to these values and removes them from further consideration in solving the CSP, at a bit setting step 60. In this manner, the processor diminishes the search space, and thus increases the density of solutions in the remaining space. Inactive bits may be detected not only before the search begins, at step 54, but also subsequently during the search.

Identification of inactive bits may also be used to identify some unsatisfiable CSPs: If processor 28 infers that a specific bit must be set to a specific value to satisfy the CSP, and also infers, possibly at a later stage, that the same bit must be set to another value to satisfy the CSP, the problem is identified as unsatisfiable.

Processor 28 identifies the inactive bits at step 54 using a recursive algorithm based on the nature of the composite constraints typical to CSP, as shown below in Table III. The algorithm does not depend on the specific constraints, but only on the operators used in their modeling:

TABLE III

IDENTIFYING INACTIVE BITS

Constraint::InferInactiveBits( )
{
  if Constraint.isAtomic( )
    InferAtomicConstraintInactiveBits( )
  else
    TrueOperandsList ← GetListOfTrueOperands( )
    for each operand in TrueOperandsList
      InferInactiveBits(operand)
    end for each loop
  end if
}

Constraint::InferAtomicConstraintInactiveBits( )

Implementation of this function depends on the specific atomic constraint. An exemplary implementation for atomic constraints that are expressed as a binary relation between expressions, such as "X+3>Y," is shown in Table A1 in the Appendix to this patent application.

Constraint::GetListOfTrueOperands( )

This function depends on the logical operator(s) used in the non-atomic constraint in question. It returns all the operands of the constraint that must be true in order for the constraint to be satisfied. For "and" this function returns all the operands. For "or", if the "or" has only one operand (as may occur in the course of reformulation, for example), this function returns it.

In addition to the basic algorithm shown above in Table III, some operands allow for more complex inferences. For example, if an "or" constraint has more than one operand, but each of the operands requires that the same bits be set to a specific value in order for the operand to be satisfied, then those bits may also be identified as inactive at step 58.

Processor 28 may use the identification of inactive bits at step 58 to remove tautological or contradictory sub-constraints from the problem, at a sub-constraint removal step 62. For example, if the processor has inferred that in any solution to the CSP, the variable X is equal to 6, then the constraint X=6 is tautological and the constraint X=5 is contradictory. In addition, atomic sub-constraints having certain syntactic patterns may be identified as tautological or contradictory. For example, a constraint of the form V=V is tautological, and a constraint of the form V>V is contradictory. When one of the constraints in the CSP includes a contradictory sub-constraint linked by conjunction ("and"), processor 28 may determine that the CSP is unsolvable. Otherwise, if the contradictory sub-constraint is linked by disjunction ("or") or is the predicate of an implication, the processor may simply remove the unsatisfiable part of the constraint.

Removing tautological and contradictory sub-constraints reduces the time it takes to calculate the cost of an assignment and may improve the cost-distance correlation of the overall cost function. For example, consider the following CSP:

1. A, B are 64 bit variables
2. A=1
3. A=0 or B=0

The cost function of constraint 3 is calculated as the minimal bit-distance from 0 of either A or B. In reality, however, the distance of A from 0 is not a good estimate for the distance from a solution of the CSP, since A will never be 0 in a solution to the entire CSP. Thus, the CSP is simplified by removing the contradictory sub-constraint A=0 from constraint 3, leaving only B=0. Now the cost function of constraint 3 depends only on the distance of B from 0. Even if it is possible to inactivate only some of the bits in A, the cost function may still be improved in this manner.

Processor 28 next identifies aliased variables, i.e., variables in the CSP that can be expressed as a function of other variables, at an aliasing detection step 64. The processor removes these aliased variables by replacing them with their aliases, at an alias replacement step 66. In other words, each constraint that contains an aliased variable is rewritten by substituting into the constraint an expression for the aliased variable in terms of other variables of the CSP. This step is useful both in reducing the size of the search space (thus increasing the solution density) and in removing local minima (so that the problem topography slopes more smoothly toward the solutions).

The processor carries out steps 64 and 66 recursively, traversing the entire CSP and collecting all possible aliases, according to the following general algorithm:

do {
    infer a maximal list of non-conflicting aliases apply all
        inferred aliases to the CSP
} until no new aliases are found Aliases may be inferred using the method illustrated in Table IV below (which includes the function GetListOfTrueOperands( ) defined above):

TABLE IV

INFERENCE OF ALIASES

```
Constraint::InferAliases(Aliases) : returns UpdatedAliases
{
    UpdatedAliases ← Aliases
    if the constraint is atomic then
        if (the constraint is of the form V = Exp or Exp = V,
            When V is a variable and Exp is an expression,
            and Exp does not refer to V)
            UpdatedAliases.AppendNonConflicting(<V, Exp>)
        end if
    else
        TrueOperandsList ← GetListOfTrueOperands( )
        for each operand in TrueOperandsList
            UpdatedAliases ← operand.InferAliases(UpdatedAliases)
        end for each loop
    end if
}
```

The function AppendNonConflicting is defined in Table V below. This function is used to detect and avoid conflicting and circular aliasing. It also reduces the list of aliases to a more compact form, where possible, by replacing aliased variables that occur in aliases of other variables:

TABLE V

REMOVAL OF CONFLICTING ALIASES

```
Aliases::AppendNonConflicting(<V,Exp>)
{
    for each Alias in Aliases
        if Alias.Variable = V
            ;;Two aliases for the same variable are conflicting
            return without appending the new alias
        end if
        if Exp refers to Alias.Variable and Alias.Expression refers
                to V
            ;;The new alias and Alias together cause circular
                ;;aliasing
            return without appending the new alias
        else
            Replace all occurrences of Alias.Variable in Exp with
                Alias.Expression
        end if
    end for
    ;;If the algorithm has reached this point, the new alias is
    ;;consistent with the aliases in the current list.
    for each Alias in Aliases
        Replace all occurrences of V in Alias.Expression with Exp.
    end for each loop
    Append <V,Exp> to list
}
```

At step 66, each alias in the list of inferred aliases found in step 64 is applied to the entire CSP, so that each occurrence of the aliased variable is replaced by the corresponding expression. Because the aliases have been reduced with respect to one another by the method shown in Table V, it is sufficient to apply each alias exactly once to the entire CSP in order to remove all aliased variables from the CSP.

In addition to removal of tautological and contradictory sub-constraints at step 62, as described above, processor 28 may also use syntactic similarities to identify redundant sub-constraints, at an equivalence detection step 68. Specifically, the processor seeks constraints containing a logical operator ("and" or "or") having two or more operands that are syntactically identical or can be easily identified as equivalent. Upon detecting such constraints, the processor removes all but one of the equivalent operands, at an operand elimination step 70.

This sort of operand removal reduces the calculation time of the cost function. It also improves the distance-cost correlation, and hence smooths the gradients leading to the global minima of the problem topography. For example, if the CSP contains the sub-constraint: "(X=1) and (3−2=X)," then the cost function will include the distance between the value of X and 1 twice, since the cost of "and" is the sum of the costs of its operands. Therefore, removing one of the redundant operands will improve the proportionality of the cost function to the actual distance from a solution.

An exemplary algorithm for identifying and merging equivalent operands of "and" and "or" constraints, at steps 68 and 70, is shown below in Table VI:

TABLE VI

MERGING EQUIVALENT OPERANDS

```
NonAtomicConstraint::Reduce( ) :
        returns <IsTruthValueKnown, TruthValue>
{
```

TABLE VI-continued

MERGING EQUIVALENT OPERANDS

```
for each Operand of this constraint
        <IsOperandTruthValueKnown, OperandTruthValue> ←
                Operand.Reduce( )
        if IsOperandTruthValueKnown
            remove Operand from this constraint
            if OperandTruthValue = DeterminingTruthValue( )
                <IsTruthValueKnown, TruthValue> ←
                        <true, OperandTruthValue>
                return
            end if
        end if
    end for
    If the operand list is now empty,
        <IsTruthValueKnown, TruthValue> ←
                <true, Not(DeterminingTruthValue( ))>
    else
        IsTruthValueKnown ← false
        Remove duplicate operands from the list of operands
    end if
}
```

DeterminingTruthValue( ): Returns TruthValue

The function DeterminingTruthValue( ) returns the truth value which, if inferred for one of the operands, can be inferred for the entire constraint. For example, for "and" the function returns "false," and for "or" it returns "true."

Typically, the steps in the reformulation process shown in FIGS. 3A and 3B are performed iteratively. In other words, processor 28 carries out each of the individual steps over all the variables and constraints in the CSP, and then repeats the entire sequence of steps 58 through 70 until a steady state is reached. For this purpose, after each pass through all the steps, the process determines whether the formulation of the CSP has changed from its state prior to the latest iteration, at a change detection step 72. Multiple iterations through all the steps take advantage of the interplay between the different methods in order to achieve the most useful reformulation of the CSP. Alternatively, even a single iteration through all or some of steps 58 through 70 will generally make the CSP considerably easier to solve.

The number of computational operations required to carry out each of the steps in the reformulation procedure described above is typically linear in the number of sub-constraints in the composite constraint. The number of iterations required until the procedure is completed, at step 72, depends on the structure of the CSP. Apart from application of aliases, at step 66, all the remaining steps in the procedure reduce the number of sub-constraints. Aliases, on the other hand, may actually inflate this number. Therefore, it may sometimes be advantageous to skip steps 64 and 66 when the CSP structure is heavily redundant.

After the CSP reformulation described above has been completed, processor 28 applies a stochastic CSP solution method to the reformulated problem, at a CSP solving step 74. The inventors have used the variable-range hopping method described in the above-mentioned U.S. Patent Application Publication 2005/0021486 A1 to good advantage for this purpose. Alternatively, other stochastic CSP solvers that are known in the art, such as those noted in the Background of the Invention, may be used. In either case, the cost (i.e., the distance metric) associated with each assignment of the variables may be computed using the computation method of the composite constraint given above in Table II, based on the atomic constraint costs determined at step 52. Upon finding an assignment with zero cost, processor 28 returns the assignment as a solution to the CSP, at a solution step 76.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

Inferring Inactive Bits in Arithmetic Relations Between Expressions

The pseudocode listing in Table A1 below describes a method for identifying inactive bits in atomic constraints that are expressed as a binary relation between expressions, such as "X+3>Y." By finding the bits that must have a certain value in the result of one of the expressions, the method determines which bits in the other expression must therefore have a fixed value. This determination is applied in order to identify inactive bits in the variables participating in the expression. The process is repeated iteratively until no new information is found:

TABLE A1

IDENTIFYING INACTIVE BITS IN BINARY ATOMIC CONSTRAINTS

```
BinaryExpressionConstraint::InferInactiveBits( )
{
    KnownBitsInLeftOperand ← N/A
    do {
        PreviousKnownBitsInLeftOperand ← KnownBitsInLeftOperand
        KnownBitsInLeftOperand ← LeftOperand.GetKnownBits( )
        KnownBitsInRightOperand ←
            GetKnownBits(LeftToRight, KnownBitsInLeftOperand)
        RightOperand.InferInactiveBits(KnownBitsInRightOperand)
        KnownBitsInRightOperand ← RightOperand.GetKnownBits( )
        KnownBitsInLeftOperand ←
            GetKnownBits(RightToLeft, KnownBitsInRightOperand)
        LeftOperand.InferInactiveBits(KnownBitsInLeftOperand)
    } while (PreviousKnownBitsInLeftOperand ≠
            KnownBitsInLeftOperand)
}
```

Expression::GetKnownBits( ): Returns KnownBits

This function returns the bits in the value of the expression in question that have a specific value, according to the expression and to bits that have been inferred to be inactive. For example, if the least significant bit (LSB) of X was inferred to be 0, and the LSB of Y was inferred to be 0, then the LSB of X+Y is known to be 0. The function is carried out recursively, using the recursive structure of the expressions from which the atomic constraint is composed. The specific implementation depends on the operators that are used to construct expressions, such as arithmetic operators (+, −, *, /, etc.) and bitwise operators (bitwise or, and, xor, etc.)

An example of an implementation for "bitwise or" is shown below in Table A2:

TABLE A2

GET KNOWN BITS FOR BITWISE OR

```
BitwiseOrExpression::GetKnownBits( ) : returns KnownBits
{
   KnownBits ← ∅
   LeftKnownBits ← LeftExpression.GetKnownBits( )
   RightKnownBits ← RightExpression.GetKnownBits( )
   for each BitIndex in {0,...,BitSizeOfExpression}
      if (<BitIndex, 1> is in LeftKnownBits or
            <BitIndex, 1> is in RightKnownBits) then
         KnownBits.append(<BitIndex, 1>)
      end if
   end for
}
```

Expression::InferInactiveBits(KnownBits)

This function determines which bits must have a specific value in order for the value of the expression in question to have the given KnownBits set to their known value. The determination may use bits that have already been determined to be inactive. For example, if it is given that the LSB of X+Y is 0, and that the LSB of Y has already been determined to be 0, then this function can infer that the LSB of X is 0. This function is implemented recursively, using the recursive structure of the expressions from which the atomic constraint is composed. The specific implementation depends on the operators that are used to construct expressions.

An example of an implementation for "bitwise or" is shown below in Table A3:

TABLE A3

INFERRING INACTIVE BITS FOR BITWISE OR

```
BitwiseOrExpression::InferInactiveBits(KnownBits)
{
   LeftAndRightKnownBits ← ∅
   LeftKnownBits ← LeftExpression.GetKnownBits( )
   RightKnownBits ← RightExpression.GetKnownBits( )
   for each <BitIndex, BitValue> in KnownBits
      if BitValue=0 then
         LeftAndRightKnownBits.append(<BitIndex, 0>)
      end if
   end for
   LeftExpression.InferInactiveBits(LeftAndRightKnownBits)
   RightExpression.InferInactiveBits(LeftAndRightKnownBits)
}
```

The recursive calls to InferInactiveBits finally result in atomic expressions, which are variables or constant numbers. The application of InferInactiveBits to an atomic expression that represents a variable of the CSP is implemented as follows:

TABLE A4

INFERRING INACTIVE BITS FOR ATOMIC EXPRESSION

```
VariableExpression::InferInactiveBits(KnownBits)
{
   if (inactive bits of Variable contradict KnownBits)
      report "The problem is unsatisfiable"
   else
      Variable.AddInactiveBits(KnownBits)
   end if
}
```

BinaryExpressionConstraint::GetKnownBits (direction, knownBits): Returns otherSideKnownBits Implementation of this function depends on the specific binary relation to which it is applied. The function receives as input the bits that the expression on one side of the relation is known to have, and returns the bits on the other side that can be inferred from the expression. For example, if the relation is ≦, and the known bits on the left side include the most significant bit (MSB), which is known to be 1 (in unsigned representation), then the MSB of the right side is also known to be 1, assuming both sides have the same bit-length. As another example, for the equality relation, assuming both sides are of the same bit-length the function is implemented as follows:

```
BinaryExpressionConstraint::GetKnownBits(direction,
knownBits) : returns otherSideKnownBits
{
   otherSideKnowBits ← knownBits
}
```

The invention claimed is:

1. A computer-implemented method for testing a system that includes a hardware device or software program, the method comprising: defining a constraint satisfaction problem (CSP) in terms of variables that are characteristic of ~ the system under test and constraints applicable to the variables, the CSP having states corresponding to respective sets of values of the variables; assigning cost functions to the constraints so that the states have respective costs determined by application of the cost functions to the respective sets of values of the variables, the respective costs defining a problem topography of the CSP having global extrema corresponding to solutions of the CSP; prior to attempting to find the solutions of the CSP, automatically reformulating the constraints of the CSP so as to perform at least one of increasing a density of the solutions in the problem topography and smoothing a gradient of the problem topography; finding one or more of the solutions of the CSP by applying a stochastic CSP solver to the reformulated constraints using at least one stochastic solution technique selected from a group of techniques consisting of local search, greedy local search, and variable-range hopping techniques; testing the system by applying the values of the variables indicated by the one or more of the solutions to inputs of the hardware device or software program; and verifying a design of the hardware device or software program responsively to the testing.

2. The method according to claim 1, and comprising defining the constraints as a composite constraint, wherein the respective costs of the states are determined by recursively combining the cost functions of the sub-constraints.

3. The method according to claim 2, wherein the sub-constraints comprise atomic constraints, which are composed of arithmetic expressions linked by comparison operators, and
wherein assigning the cost functions comprises assigning respective atomic cost functions to the atomic constraints, and determining the cost functions of the sub-constraints from the atomic cost functions.

4. The method according to claim 1, wherein increasing the density of the solutions comprises eliminating a region of the problem topography that does not contain any of the solutions to the CSP.

5. The method according to claim 4, wherein the variables comprise bits, and wherein eliminating the region comprises identifying one or more of the bits that must have a specific value in order for the CSP to be satisfied, and setting the one or more of the bits to the specific value.

6. The method according to claim 1, wherein smoothing the gradient comprises eliminating one or more local extrema from the problem topography.

7. The method according to claim 1, wherein the constraints in the CSP comprise logical operators, which comprise at least one of a negation operator and implication operators, and wherein reformulating the constraints comprises eliminating from the constraints one or more of the negation and implication operators.

8. The method according to claim 1, wherein reformulating the constraints comprises identifying at least one of the variables that is aliased, such that the at least one of the variables can be expressed as a function of one or more others of the variables, and replacing the at least one of the variables in the constraints with an expression in terms of the one or more others of the variables.

9. The method according to claim 1, and comprising defining the constraints as a composite constraint, wherein reformulating the constraints comprises determining that at least one of the sub-constraints is tautological, and eliminating the at least one of the sub-constraints from the CSP.

10. The method according to claim 1, and comprising defining the constraints as a composite constraint, wherein reformulating the constraints comprises determining that two or more of the sub-constraints that are linked as operands of one of the logical operators are equivalent, and eliminating at least one of the two or more of the sub-constraints from the CSP.

11. The method according to claim 1, wherein verifying the design comprises revealing a bug in the hardware device.

\* \* \* \* \*